United States Patent

[11] 3,571,497

[72] Inventor James F. Butterfield
Van Nuys, Calif.
[21] Appl. No. 727,412
[22] Filed May 8, 1968
[45] Patented Mar. 16, 1971
[73] Assignee The Battelle Development Corporation
Columbus, Ohio

[54] LIGHT PUMP FOR ENHANCING SUBJECTIVE COLOR
22 Claims, 12 Drawing Figs.

[52] U.S. Cl. .......... 178/5.4, 352/234
[51] Int. Cl. .......... H04n 9/22
[50] Field of Search .......... 178/5.4, 5.2; 352/234, 66; 353/31

[56] References Cited

UNITED STATES PATENTS

| | | | |
|---|---|---|---|
| 2,731,511 | 1/1956 | Wiesen | 178/5.4 |
| 2,844,990 | 7/1958 | Nagler et al. | 352/234 |
| 3,311,699 | 3/1967 | Butterfield | 178/5.2 |

*Primary Examiner*—Robert L. Griffin
*Assistant Examiner*—John C. Martin
*Attorney*—Lyon & Lyon

ABSTRACT: Colored light is added to information displayed in subjective color to provide more saturated color. The colored light is added at the display to impinge upon the eyes of a viewer. Hues of colored light may be synchronized with the subjective color information sequence to enhance selected subjective colors and to reduce flicker. There are also disclosed various forms of light pumps, the manner in which synchronization is achieved, and the effect of selected colors on certain subjective colors.

INVENTOR.
JAMES F. BUTTERFIELD

BY Lyon & Lyon

ATTORNEYS

Patented March 16, 1971

3,571,497

2 Sheets-Sheet 2

INVENTOR.
JAMES F. BUTTERFIELD

BY Lyon & Lyon
ATTORNEYS

LIGHT PUMP FOR ENHANCING SUBJECTIVE COLOR

Reference is made to applicant's U.S. Pat. No. 3,311,699, and to applicant's copending applications entitled "Production of Subjective Color by Animation Techniques," Ser. No. 625,783 and "Combining Physical and Subjective Color," Ser. No. 625,813, both filed Mar. 24, 1967, the disclosures of said patent and applications being incorporated herein by reference.

The present invention relates to subjective color, and more particularly to the enhancement of information displayed in subjective color.

The subjective color phenomenon has been investigated and observed over a number of years. Benedict Prevost is credited with discovering this phenomenon in the early 1800's. Later, J. R. Fechner experimented with black and white rotating discs, and subsequently C. E. Benham designed a disc having only black and white patterns thereon, some of which would appear in color when the disc was rotated. The repetition of certain sequences of light and dark areas apparently is interpreted by the eye and brain as color, and the composition of the sequence and rate of repetition determine the characteristics of the color perceived. There is described in U.S. Pat. No. 2,844,990 to Nagler et al. the production of subjective color by presenting a series of pictures with motion picture or television equipment. Individual film frames are prepared in which the areas to appear in subjective color are formed by a plurality of spaced black and white lines or crosshatching.

In applicant's Pat. No. 3,311,699 there are disclosed for producing subjective colors several methods and arrangements of causing areas or color components to appear light and dark in certain sequences rather than by using spaced lines or crosshatching as described by Nagler et al. U.S. Pat. No. 3,311,699 describes "live" pickup of a scene or image, and such pickup may be accomplished through the use of filters in conjunction with a television or motion picture camera.

In the copending application entitled "Production of Subjective Color by Animation Techniques" there is described the production of selected subjective colors in a relatively simple manner through the use of animation techniques. The copending application entitled "Combining Physical Color and Subjective Color" relates to the combining of regular (physical) color and subjective color to provide mixed color or saturated color.

The subjective colors produced by some prior methods have not been completely saturated and have appeared pale and washed out. Observers have noted that the shades and saturations vary under different viewing conditions, but the exact cause of the variations has not heretofore been determined. Subjective color pictures also have a flicker which is considered objectionable. The low color saturations as well as the shifting in hue and saturation under different circumstances along with the flicker have limited the usefulness of subjective color systems. Applicant has determined that some of the degradation in the transmission and reproduction of subjective color information via ordinary television equipment results from the phosphors in the cathode ray tube having color temperatures over 10,000° K., which tends toward the blue end of the spectrum. Additionally, it has been determined that the variations in observed saturation and shifts in hues that occur in viewing subjective color information are often caused by the effect of the ambient lighting upon the display and upon the eyes of the observer.

Accordingly, it is a primary object of the present invention to provide a method for increasing the saturation of colors observed in subjective color systems.

It is another object of this invention to provide an apparatus for increasing the saturation of colors observed in subjective color systems.

An additional object of this invention is to combine colored light with subjective color information to provide more saturated colors.

A further object of this invention is to combine colored light with subjective color information in a given sequence to improve saturation of color.

Another object of this invention is to reduce or eliminate shifts in hues and saturation in subjective color.

It is another object of this invention to enable reduction in flicker in a subjective color information display.

Another object of this invention is to compensate for a color temperature of cathode-ray tubes or film projectors.

These and other objects and advantages of the present invention will become more apparent through a consideration of the following description taken in conjunction with the drawings in which.

Figures 3A, 4:
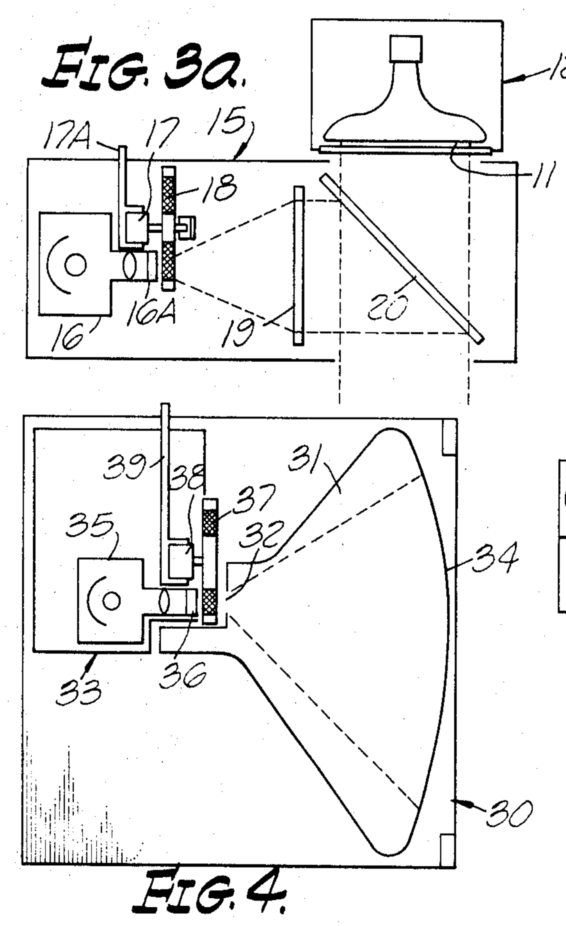
Figure 3B:
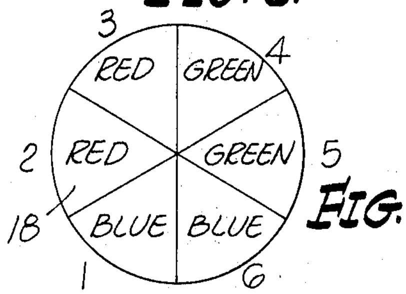

FIG. 3*a* is a perspective view of an exemplary light pump arrangement used with a black and white television receiver;

FIG. 3*b* is a rear view of a filter disc used with the light pump of FIG. 3*a;*

Figure 5:
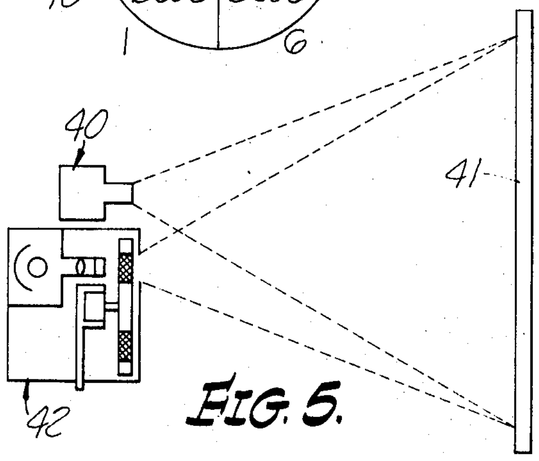
Figures 6A, 6B, 6C, 6D, 6E, 6F:
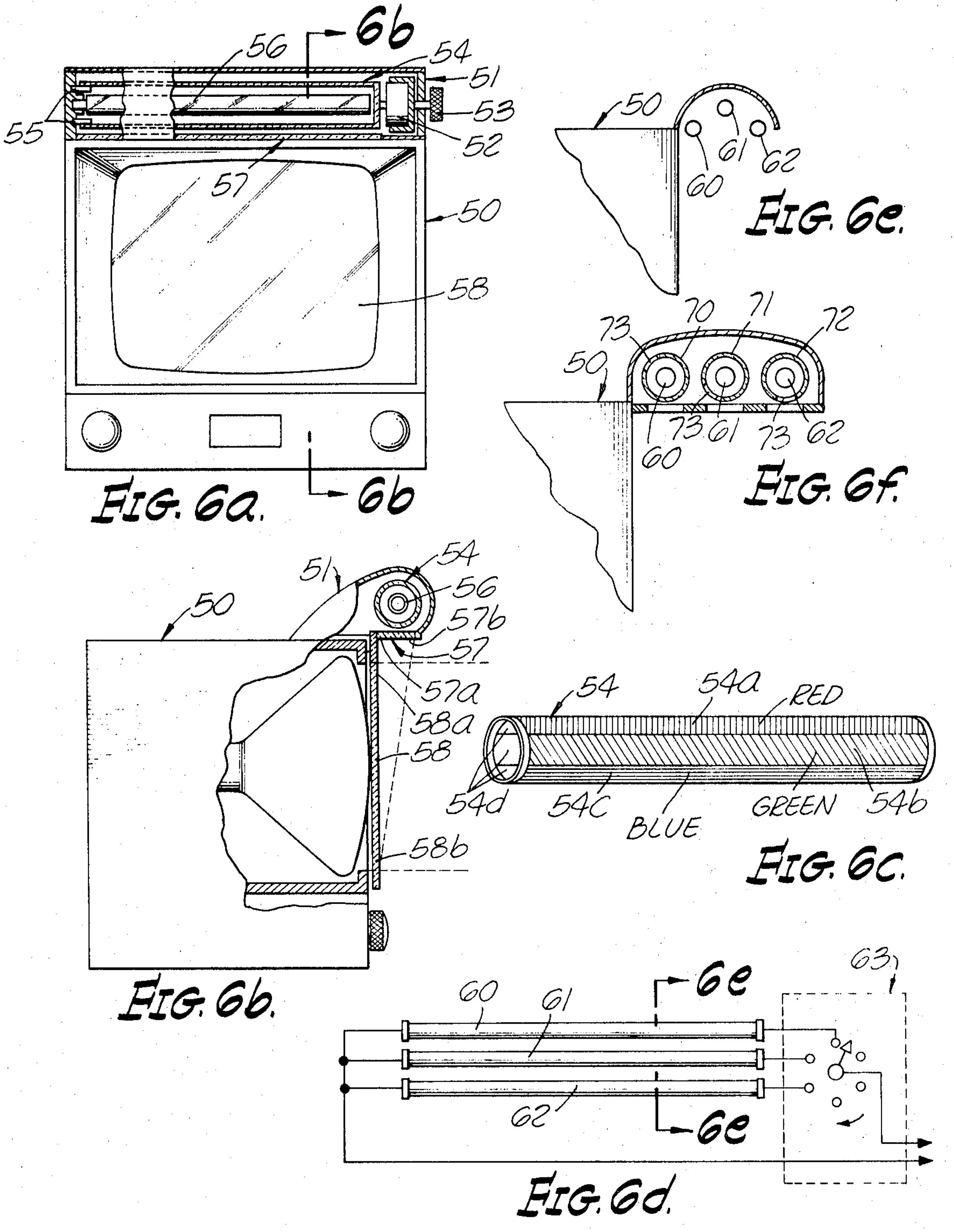

FIG. 4 is a plan cross-sectional view of a television monitor employing a special cathode-ray tube and a light pump according to the invention;

FIG. 5 is a diagrammatic plan view of a subjective color projection system and light pump;

FIG. 6*a* is a front elevational view of a television monitor having a light pump according to the present invention mounted thereon;

FIG. 6*b* is a cross-sectional view taken along a line 6*b*–6*b* of FIG. 6*a;*

FIG. 6*c* illustrates a filter drum used in the light pump of FIG. 6*a;*

FIG. 6*d* illustrates an alternative form of light pump which may be used in the arrangement of FIG. 6*a;*

FIG. 6*e* is a cross-sectional view taken along a line 6*e*–6*e* of FIG. 6*d;* and FIG. 6*f* is a cross-sectional view of an alternative form of the arrangement shown in FIG. 6*d.*

The present invention is concerned with the display of information in subjective color, such as the display of a scene or image, indicia, and so forth. Basically, the invention is concerned with a subjective color display by black and white equipment (such as by a cathode-ray tube in a black and white television receiver, computer readout, oscilloscope, and so forth), modified by a flood of physical colored light. The term physical color is used so as to distinguish between regular color and subjective color. The invention is directed to increasing the saturation of subjective color information, to saturations approaching or surpassing an ordinary physically colored image.

Briefly, the objects and advantages of the present invention are attained by pumping visible energy into the subjective color system at the receiving, or viewing, end. This energy can be added in mass and need not be modulated by the transmission end as to color elements, dots or lines of the picture. Under some circumstances the pumped energy can be synchronized and phased as to the frame or field rate, or it can be completely independent of the transmission. The pumping of visible energy differs from the use of a filter in front of a screen. For example, reduction in cathode-ray tube color temperature can be accomplished by using an amber filter in front of the screen. However, the use of an amber light pump differs therefrom because the filter only lowers the color temperature of illuminated areas and has no major effect on nonilluminated areas. By temporal and spacial diffusion, a filter slightly colors the opaque phase and the dark subjective color creating areas. On the other hand, the light pump supplies amber (reddish) light energy into the entire picture, and thus colors all areas thereof which is of significant importance as will be described later. Additionally, the light pump can supply more energy than the cathode-ray tube itself emits and therefore has a more substantial effect on the image.

The characteristics of the visible energy pumped with respect to wavelength, brightness, whether constant or intermittent, and so forth, are determined by various requirements. Improvement in overall saturation may be desired, or only particular wavelengths may require improvement. On the other hand, the pumped light may mix with the subjective color to produce another hue, which is the summation of the subjective color and the physical color of the pumped light. Compensation for the color temperature of the cathode-ray tube or motion picture light source may be desired, or flicker reduction may be required. In these latter cases, the light energy is pumped during the black (opaque) subjective color phase thereby causing the total light energy not to decrease greatly during this phase. The black (opaque) phase also is referred to as the discharge phase since it is believed that the absence of white light during this phase discharges the eye of the viewer and prepares him for the next subjective color sequence. Even when the light pump is used, this discharge phase of the sequence is still effective as a discharge because colored light rather than white light is used. In most cases, a light pump will stabilize the level of saturation and color hue observed, and the pumping action can be applied to the entire picture or to only a portion thereof.

Light may be pumped directly into the eyes of an observer from one side of the screen, whereby it biases the entire eye by diffusion and colors the entire field of view. Alternatively, the light may be pumped directly onto the screen, or onto an intermediate member, with the superimposed summation of the subjective color image plus the reflected pump light being viewed by the observer.

It should be noted that the field sequential color system which uses filters at the transmitting and receiving ends should not be confused with the present invention. Although in the preferred form of the present invention a filter disc is used at the transmitting and receiving ends, there are significant differences from the field sequential system. With the subjective color system complementary filters are used at the transmitting end and primary filters at the receiving end, or vice versa; whereas primary filters are used at each end of the field sequential system. The subjective color system will produce color without a filter disc at the reciever, but the field sequential will not. In order to sustain color in a subjective color system an opaque (discharge) period is required preceding each color creating sequence, but this is not necessary in a field sequential system. A subjective color sequence (including the discharge) should have a duration of approximately 200 milliseconds for maximum color saturation, which results in frequencies of about 5 hertz. Field sequential systems have higher frequencies (20 to 60 hertz).

The present subjective color system uses a flood of light at the receiver which can be directed from one side and does not have a disc size limitation and, consequently, a cathode-ray tube size limitation such as occurs with the field sequential system. The field sequential disc cannot be too large (i.e., more than 12 inches OD), or its actual physical size, motor vibration, etc., present troublesome problems. The light pump need not restrict black and white viewing; whereas the disc of the field sequential does block the screen of the receiver. In some cases the light pump can start and stop at any phase; whereas the field sequential system must be precisely synchronized, i.e., filters cannot be skipped and their sequence is unalterable.

Note should be made of the fact that subjective color created by a Benham disc, or the like, appears to be an edge effect. The highest saturations are seen with thin lines and narrow areas. Large thick areas appear colored at the edges and dark or black in the center. A light pump causes the effect of subjective color to spread across larger areas. Furthermore, a Benham disc usually requires that the areas to be subjectively colored lie against a larger white surround. The size and whiteness requirements of the surround are reduced somewhat by use of a light pump.

A light pump according to the present invention can take several forms, it may simply be a source of light such as a lamp, or it may be a complex projector. In the case where a general improvement in saturation of a subjective color television image is desired, an ordinary incandescent lamp may be placed alongside, on top, or behind the television receiver (note FIG. 1, lamp 13). The yellowish color (color temperature approximately 2,850° K.) of the lamp will provide red and yellow wavelengths to counteract the bluish color (color temperature approximately 10,000° K.) of the screen of an ordinary television set (which has P4 phosphor in the cathode-ray tube). Daylight, depending upon conditions, such as the time of day, can sometimes serve as a light pump.

Usually it is not possible to obtain a subjective red on the television receiver in a blacked-out room, and lime green is seen instead. Under such conditions, the subjective green and blue may shift places and are poorly saturated. If the room is illuminated with a bluish "Daylight" fluorescent lamp (color temperature approximately 5,000° K.), the result is about the same. However, the addition of light from an incandescent lamp or nonbluish fluorescent lamp (such as "warm white," "-pink" or "red") causes the subjective colors to appear in the correct places and provides good red saturation as well as green and blue. This occurs because the lamp adds red wavelengths to the eye, by means of the rays that go directly from the lamp to the eye and by means of those rays that bounce off the walls, objects, etc., to the eye. Chromatic or colored light, as distinguished from achromatic or white light, is preferred. Also, the wavelength of the light preferably should be longer than approximately 5,500 angstroms. As in normal practice, care should be taken to see that the lamp illumination (particularly if it is a white lamp) does not reflect off the television screen as this reduces the contrast (by "washing out" the picture) and reduces the subjective color effect.

The brighter the lamp is and the closer it is to the television screen and, therefore, the closer its image is to the subjective color image on the eye's retina, the higher the saturation of subjective red, green and blue colors. However, there seems to be a limit on the increase in saturation a white light can produce. There is a relation to: increase in saturation based upon color temperatures of television vs. lamp; lumens of television vs. lamp; location of television vs. lamp; and the particular subjective color sequence employed. The saturations increase as the lamp's color is varied from white to yellow to pink and finally to red. Subjective red may have, for example, an 80 percent saturation in the latter case with the green and blue about 50 percent saturated. Other wavelengths of pumped light may be employed to invert subjective color positions or heighten saturation of selected colors. The actual size of the light producing area is important, and a large diffuse area is preferred over a spot source. Very high saturations can be obtained by causing the yellow or red light to come from the same area as the television image and thereby fall on the same retinal area. For example, a red floodlamp may be directed at the television screen from one side. The pumped light then reflects off the protective glass front and off the front of the CRT tube into the eyes of the observer. This method has a disadvantage in that the black areas of the scene take on a reddish hue and white areas are pinkish. However, because of the color contrast phenomenon (sometimes called the Land effect), the pink-white becomes the reference white. Also, if the two levels are equal or the television is brighter, the effect is minimal. The subjective red may appear more saturated than the saturation of the pumped red light because the observed color is a summation of the reflection of the pumped red light and the subjective red. The hues of the two reds should match for maximum saturation.

When high saturations of all three primaries are desired, a sequence of red, green and blue light may be pumped into the system. This should be done in synchronism and in phase with the production of subjective red, green and blue. That is, the red light is pumped onto the screen during the red creating phase, green light is pumped during the green creating phase, and blue light during the blue creating phase. This eliminates the undesirable effect, previously mentioned, wherein the pumped light gives the black and white areas a color cast. Now the temporal sum of the red, green and blue pumped wavelengths produces white which will not discolor the picture. The sequence frequency should be over 5 hertz (the three physical colors together should not last longer than one-fifth of a second) for the red, green and blue to mix and appear white. The intensities of the different pumped colors should be adjusted so that when mixed temporally the summation appears white. The black areas of the scene will become gray because of the white physical light added to them. This is partially compensated for by the white areas being whiter because of the white physical light added to them. The range of the scene from black to white remains about the same.

The instant that subjective color is perceived may not be the same instant that the same hue physical color is perceived, and this time differential may vary according to color hue. The physical color should be shifted in phase to compensate for any time differential so that the physical and subjective colors are perceived simultaneously. However, there is another effect that should be taken into account, i.e., each physical color should have a certain phase relationship with each corresponding subjective color but the physical color phase may not necessarily be of the same duration as the corresponding subjective color creating dark area. For example, in obtaining red subjective color the physical red light should be pumped during the latter part of the discharge period, and the first part of the subjective red creating phase rather than only during the exact duration of the red creating phase.

When a physical color transmission medium is used with the subjective color (see, for example, FIG. 10A of U.S. Pat. application Ser. No. 625,813,), the coloration of white and black areas does not occur. However, there is a limit to the amount of physical color energy which can be used in this case, and the amount is always less than the physical white level unless white areas are grayed, in which case subjective color is reduced. On the other hand, when the light pump is used, its physical color may be many times the physical white level of the transmission medium. If the light pump is combined with the supersaturated color transmission (physical plus subjective color), higher saturations should result. If desired, red, green and blue pumped light can be sequenced during the opaque (discharge) period to give the composite image a steadier base level of illumination and thereby reduce the overall flicker caused by the screen going completely black periodically as a result of the opaque (discharge) period.

Quantities of energy from a light pump, even of colored light, may reduce contrast significantly. If the colored light pump energy equals television screen energy, then the contrast is not reduced greatly nor are black or white areas significantly tinted.

Apparently the colored light pumped during the discharge phase does not affect the discharge action. White light, if it were of the intensity of the television picture, would nullify the discharge. Some colors (red) serve better in the discharge phase than others by: (1) not adversely affecting subjective color; (2) increasing saturation of some or all of subjective colors; and (3) filling in the discharge phase to reduce flicker. The use of pumped colored light during the discharge phase not only reduces flicker, but improves the color in other ways. The sector of the discharge phase immediately preceding the red creating phase can be used to pump red light and the sector of the discharge immediately following the blue creating phase can be used to pump blue light. The possible persistence of the blue subjective phase in the latter case causes the pumping effect to appear to take place over a longer period of time. When the combined colors are then extended, the color flicker is reduced. Also, the input of red pumped light at the end of the discharge phase seems to shape the eye's "on-off" pulse to produce a more highly saturated subjective red.

Figure 1:
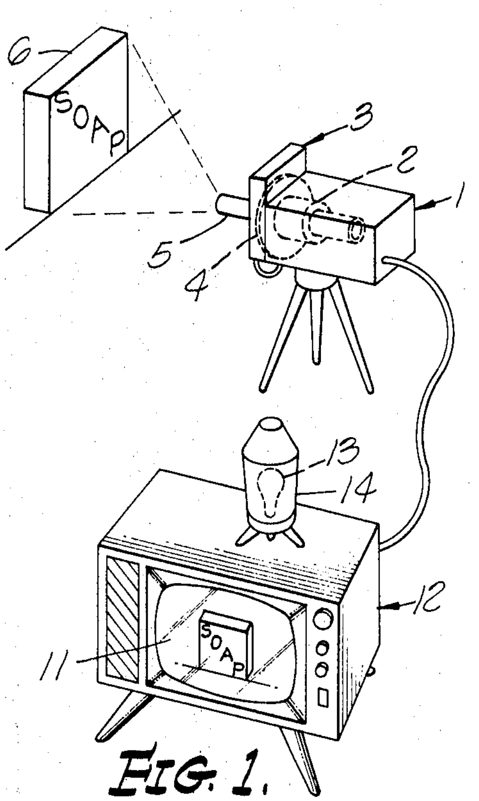
FIG. 1 is a schematic perspective view of a subjective color television system including a black and white television camera and an optical disc mechanism (subjective color translator) according to said Pat. No. 3,311,699, along with a receiver and a light pump.

Bearing the foregoing discussion in mind, there is shown in FIG. 1 a typical subjective color television system which includes a black and white television camera 1 with pickup tube 2 in front of which is an optical disc mechanism (subjective color translator) 3 with filter disc 4 and lens 5. The camera 1 is directed at a scene which includes a white box 6 having a red letter S, a green letter O, a blue letter A, and a black letter P. Reference is made to said U.S. Pat. No. 3,311,699 for a more extensive discussion of the translator 3.

On the cathode-ray tube screen 11 of black and white television receiver 12, the soap box 6 may be seen with the original hues in full subjective color. The picture appears in color because the color translator 3 has means including filter disc 4, which causes the television picture to be presented in a repeating subjective color sequence of, in this example, six television frames as shown in the left section of FIG. 2. Frames 1 and 2 are opaque (discharge) frames. Frames 3 through 6 are the subjective color creating frames. Frame 3 creates red, frames 4 and 5 create green and frame 6 creates blue. Note that the red letter S is black in frame 3, the green letter O is black in frames 4 and 5, the blue letter A is black in frame 6 and the black letter P is black in frames 3 through 6. The white box 6 is white in frames 3 through 6. In this example, when a particular primary colored letter is not black in a specific frame then it is substantially white and it blends into the white of the box. Filters could vary from field to field rather than frame to frame.

The subjective color sequence creates a flickering color image on the screen 11. If the cathode-ray tube has a color temperature of around 3,000° K. then a medium saturated full color picture is seen. However, since cathode-ray tubes normally have a bluish-white fluorescence with a color temperature over 10,000° K., the picture seen in the screen 11 is poorly saturated and in some cases the reproduced hues may not agree with those of the original scene. This assumes that the receiver is located in a blacked-out room.

Now, if an incandescent lamp 13 is turned on providing ambient room lighting with a color temperature of about 2,850° K., the subjective color television image improves. The reproduction assumes the correct hues and the saturation increases to the medium ranges. The brighter the lamp 13 and the closer the lamp is to the television screen 11, the better the saturations. The white lamp should, of course, not be in a position which causes its light to fall on the television screen as this will reduce the picture contrast and "wash out" the color because the creation of subjective color somewhat depends upon a high contrast picture.

The saturations are improved if the lamp has a large diffuse shade 14 which causes the light to reach the retina of the eye from a larger area. If the wall behind the television set is white, this serves somewhat the same purpose. A projector could, by back or front projection, illuminate a screen or wall around the television. The light from the lamp apparently diffuses over the surrounding retinal areas and into the area of the retina upon which the television screen 11 is focused. The long wavelengths of the lamplight combine in the eye with the short wavelengths of the television phosphor and compensate for the excess of the latter.

Further saturation improvement is found if the diffuse shade 14 or the lamp 13 is red. In this case, the saturation of red becomes high, and blue and green are increased somewhat. The configuration of the lamp fixture and the means of light production (incandescent, fluorescent, etc.) are not important as long as the lamp is near the television screen and it is large and bright with an excess of yellow and red frequencies (above 5,500 angstroms).

In the case of red light, up to a certain brilliancy, it can be directed to fall on the television screen (without washing out the color) with a further increase in saturation. However, the black and white areas of the picture (letters and box) take on a reddish cast. The reddish cast is not very noticeable in the white areas since the eye and brain compensate for the pinkish-white and identify this as a reference white. If the hue of the red lamp and the hue of the subjective red are adjusted to agree with each other an intensely saturated red appears on the television screen 11.

Figure 2:
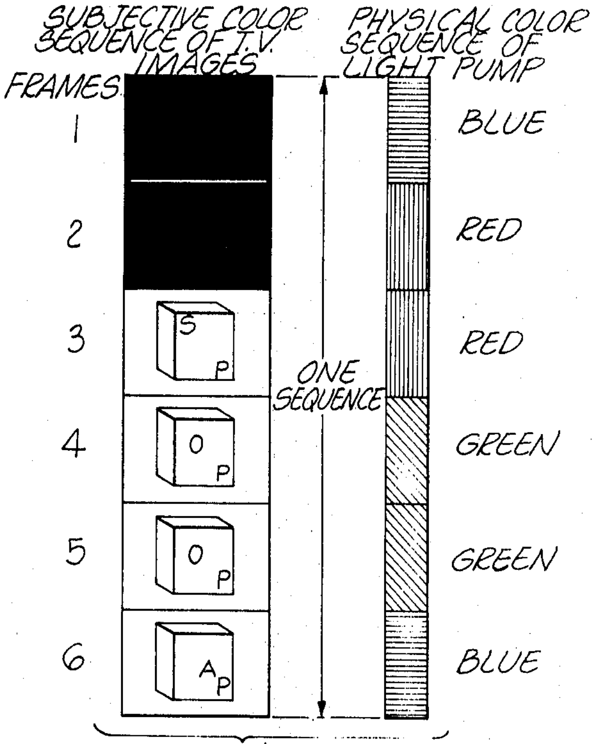
FIG. 2 is a diagrammatic illustration of the sequencing of a light pump with respect to a subjective color sequence.

To achieve saturated greens and blues it is necessary to direct the appropriate colored light to the eye directly or to reflect it off the television screen 11 during the appropriate frame. That is, red light during the red creating frame 3, green light during green creating frames 4 and 5 and blue light during blue creating frame 6. This sequence is shown in FIG. 2.

It has been found advantageous to double the length of time that red and blue light are pumped into the system by having blue light in frame 1 and red light light in frame 2. This then provides a period of uniform duration for each of the primary colors. The sequence is fast enough so that the three primaries sum temporally and the light pump casts a flickering white light into the eye or directly on the television screen. The black and white areas (letters and box) do not have a color cast and are seen as black and white. The presence of light from the light pump during the discharge period reduces the flicker caused by the opaque discharge frames 1 and 2, because there is a steadier level of illumination at all times.

FIG. 3*a* illustrates one form of a light pump. The television receiver is again identified as 12 and the screen of the cathode-ray tube as 11. The light pump 15 includes a lamp house 16, neutral density filter 16A, synchronous motor 17, phasing means 17A, filter disc 18, diffusion screen 19 and semisilvered mirror 20. The light from the lamp house is filtered by disc 18 shown in more detail in FIG. 3*b*. Here the color filters are positioned so that the required sequence of colors is produced as motor 17 turns filter disc 18 at 5 r.p.s. in synchronism and phase with a similar motor and disc 4 in color translator 3 (FIG. 1). Synchronism is easily maintained if both camera and receiver are on a common 60 hertz powerline. Electronic means, such as designed in the past for field sequential color television can be used to synchronize and phase the transmitting (color translator) and receiving (light pump) discs. Manual mechanical phasing means can be used at the light pump. In this latter case, the motor is usually mounted in a cradle, which is revolved slowly by hand until visual observation indicates a light pump filter is in exactly the same position as the corresponding color translator filter. For example, the beginning of the second red filter in the light pump should occur simultaneously with the beginning of the cyan filter in the color translator.

Diffusion screen 19 is used to provide an image of a diffuse area of colored light which is reflected off of semisilvered mirror 20 into the eye. The semisilvered mirror 20 is so positioned that television screen 11 can also be seen through it; so that the image on diffuse screen 19 and the image on television screen 11 are superimposed. The use of light pump 15 then provides a highly saturated full color subjective color image on ordinary black and white reciever 12. Light pump 15 could be placed along side the receiver 12 and directed at the eye; however, the effect is not as satisfactory.

A lamp such as 13 or a light pump such as 15 can be used when the entire raster is a subjective color picture or when electronic or optical keying are used so that the raster consists of a black and white image with a subjective color image inserted.

FIG. 4 illustrates another form of the light pump in which a television monitor 30 has a special cathode-ray tube 31 (such as Sylvania No. SC3875) with a transparent rear port 32. Light pump 33 rear projects a color flood on the screen 34 of the cathode ray tube 31, and this flood is superimposed on the regular television image. Light pump 33 includes a light source 35, diffusing glass 36, filter disc 37, synchronous motor 38 and phasing control 39. The white light from source 35 is diffused by glass 36 and tinted by filters of disc 37. The resulting colored light strikes the screen 34. The motor 38 revolves disc 36 which changes the color of the light in synchronism with the presentation of the television images. Control 39 phases the motor 38 so that the phase of filter disc 37 corresponds to the phase of the television image.

Another similar arrangement is to use a color television monitor which is receiving a black and white signal and displaying a subjective color image. All three guns (red, green and blue) are then firing partially to produce the black and white image. The light pump action can be achieved by additionally firing the red gun at near full brilliance during the red creating phase (frame 3 of FIG. 2); then firing the green gun at near full brilliance in the green creating phase (frames 4 and 5); and likewise the blue gun in the blue creating phase (frame 6). The guns can be fired in proper sequence, synchronism and phase with the television frames by using an electronic switch such as shown in FIG. 6*d*.

FIG. 5 illustrates a subjective color display system in which a light pump is employed. In this case, an image from a subjective color projector 40, which may be a slide or film projector, is focused on screen 41. Superimposed on the image is light from pump 42 which is similar in construction to pump 33. This may be a back projection or front projection system.

In FIGS. 6*a* through 6*f*, a category of light pumps is illustrated where the light source is elongated and a filter drum, electronic switch or shutter is employed to produce the desired color in synchronism and phase with the television image.

A television monitor 50 with a light pump 51 attached is shown in FIG. 6*a*. Light pump 51 includes a motor 52 which turns filter drum 54, and a phasing control 53. Drum 54 is supported in roller bearings 55. Within the drum is a Lumiline-type white lamp 56. Colored light from filter disc 54 is diffused and graduated by translucent screen 57. Area 57*a* of the translucent screen is dark and area 57*b* is transparent. The neutral density of screen 57 is graduated between these two extremes. Light from the light pump falls at a sharp angle on semireflecting and semidiffuse glass 58. The light reflected at 58*a* to an observer is equal to that at 58*b* because of the neutral density graduation of 57.

FIG. 6*c* shows the configuration of the drum 54 which includes, in this example, red filter 54*a*, green filter 54*b*, blue filter 54*c*, and three opaque filters 54*d*.

Another type of light pump is shown in FIg. 6*d* in which 3 colored lamps 60, 61, 62, are used, and may be disposed as shown in FIG. 6*e*. These may be actually colored tubes such as colored fluorescent tubes, or may be white tubes with colored filters adjacent thereto. The tubes are connected to an electronic switch which is illustrated in diagrammatic form at 63. As the switch operates, first one and then another tube is illuminated. Finally all three tubes are turned off. While in previous cases the light source, such as 16, 35 or 56 could be incandescent, which have a delay, here the light tubes must be capable of instant on and off. Fluorescent tubes or rare gas tubes can be used for this purpose. Also the screen 57 and glass 58 are used in the embodiment shown in FIGS. 6*d* and 6*e*.

Another way of sequencing the light on and off at the proper time for each of tubes 60, 61, 62 is shown in FIG. 6*f*. Here, revolving opaque drums 70, 71 and 72 with aperture 73 in each drum are used around each lamp tube. No electronic switch is required.

From the foregoing description, it will be evident that the present invention provides a method and apparatus for greatly enhancing a subjective color image when transmitted over black and white television. Although described and illustrated with reference to television, this invention also is applicable to motion picture displays, radar and other pictorial communications systems, for computer readouts and oscillographic displays, and the like. A color translator is not required, nor is a pickup means required; a computer, animation, or other means may be used to produce pictorial data in a subjective color sequence. The light pump is useful in any case to enhance the image.

The present embodiments of this invention are to be considered in all respects as illustrative and not restrictive, the scope of the invention being indicated by the appended claims rather than by the foregoing description and all changes which come within the meaning and range of equivalency of the claims therefore are intended to be embraced therein.

I claim:

1. A method of enhancing an information display in subjective color comprising the steps of:
modulating light in a subjective color sequence to provide subjective color information on a display screen;
flooding said display screen with colored light to cause said colored light to combine with said information; and
modulating said colored light in a sequence bearing a predetermined relation to said subjective color sequence.

2. A method as in claim 1 wherein the modulation of said colored light includes varying the hue thereof.

3. A method as in claim 1 wherein said colored light includes plural colored light sources of different hues which are controlled as a function of said subjective color sequence.

4. A method as in claim 1 wherein said colored light is reflected from said display screen and into the eyes of an observer.

5. An apparatus for enhancing a subjective color display comprising:
display screen means upon which subjective color information may be displayed; and
light pump means mounted adjacent said display screen means for combining light from said pump means with said subjective color information from said display screen, said light pump means including lamp means for generating light of plural colors in a predetermined relationship with said subjective color information.

6. An apparatus as in claim 5 wherein the hue of light from said pump means corresponds with the hue of subjective color from said display screen.

7. Apparatus for enhancing a subjective color display comprising:
subjective color display means by which subjective color information may be displayed;
a radiant energy source; and
means for causing said source to emit light of different colors in a modulation sequence in which light of different colors is emitted in accordance with respective phases of a subjective color sequence and for causing said colors to combine with said subjective color information.

8. A method of enhancing a subjective color display comprising:
modulating light in a subjective color sequence from a display device having a reflecting surface and
causing colored light to reflect from said reflecting surface of said display device to cause said colored light to combine with light emanating from said display device to enhance subjective color from said display device.

9. A method of enhancing an information display in subjective color comprising the steps of:
providing subjective color information on a display screen; and
flooding said display screen with colored light by projecting said colored light on said display screen to cause said colored light to combine with said information on said display screen.

10. A method of enhancing an information display in subjective color comprising:
providing an information display in subjective color by modulating light from said display in a sequence including a discharge phase and a color creating phase;
modulating colored light as a function of said sequence; and
causing said colored light to reach the human eye from the same general area as light from said display.

11. A method as in claim 10 wherein the hue of said colored light is similar to the hue of the subjective color created by said color creating phase.

12. A method as in claim 11 wherein said colored light is modulated to cause it to be perceived during the same time period the subjective color from said creating phase is perceived.

13. A method of enhancing an information display of light in subjective color comprising:
providing an information display in subjective color by modulating light from said display in a sequence including a discharge phase and several color creating phases;
modulating said colored light as a function of said sequence; and
causing colored light to reach the human eye from the same general area as light from said display by presenting blue and then red colored light during said discharge phase and by presenting red, green and blue colored light during said color creating phases.

14. An apparatus for enhancing a subjective color display comprising:
display screen means upon which subjective color information may be displayed;
light pump means mounted adjacent said display screen means for combining light from said pump means with said subjective color information from said display screen, said light pump means including lamp means for generating light of plural colors; and
synchronizing means coupled with said light pump means for synchronizing the presentation of said light of colors in relation to the display of subjective color information.

15. An apparatus as in claim 14 wherein a semireflecting surface is mounted adjacent said display screen means and said light pump means, said semireflecting surface allowing light from said display screen means to pass therethrough and causing at least some of the light from said light pump means to be reflected therefrom and combined with information from said display screen means.

16. An apparatus as in claim 15 wherein said lamp means includes a plurality of colored light sources and switch means coupled with said light sources for sequential energization thereof.

17. An apparatus as in claim 15 wherein said light pump means includes a plurality of light sources and movable shutter means mounted adjacent respective light sources.

18. An apparatus as in claim 15 wherein said light pump means includes said lamp means and a plurality of color filters interposed between said lamp means and said semireflecting surface.

19. An apparatus as in claim 18 wherein said color filters are in the form of segments of a disc.

20. An apparatus as in claim 18 wherein said color filters are in the form of segments of a drum.

21. A method of enhancing a subjective color display comprising the steps of:
modulating light in a subjective color sequence to provide a subjective color display;
combining colored light with said modulated light from said display; and
modulating said colored light in a sequence bearing a predetermined relation to said subjective color sequence.

22. A method as in claim 21 wherein said chromatic colored light is predominantly of wavelengths longer than approximately 5,500 angstroms.